United States Patent [19]

Seidel

[11] 3,911,372

[45] Oct. 7, 1975

[54] AMPLIFIER WITH INPUT AND OUTPUT IMPEDANCE MATCH

[75] Inventor: Harold Seidel, Warren, N.J.

[73] Assignee: Bell Telephone Laboratories, Incorporated, Murray Hill, N.J.

[22] Filed: Dec. 6, 1971

[21] Appl. No.: 204,804

Related U.S. Application Data

[63] Continuation-in-part of Ser. No. 113,201, Feb. 8, 1971, abandoned.

[52] U.S. Cl. .............. 330/53; 330/124 R; 330/30 R

[51] Int. Cl.$^2$ .............................................. H03F 3/60

[58] Field of Search ........ 330/53, 124 R, 165, 30 R; 333/11, 18, 10

[56] References Cited

UNITED STATES PATENTS

| | | | |
|---|---|---|---|
| 2,229,090 | 1/1941 | Kinzer | 333/11 X |
| 3,202,927 | 8/1965 | Ishimoto et al. | 330/124 R X |
| 3,403,357 | 9/1968 | Rosen et al. | 330/124 R X |
| 3,426,292 | 2/1969 | Seidel | 330/53 X |
| 3,605,031 | 9/1971 | Tongue | 333/11 X |

*Primary Examiner*—Nathan Kaufman
*Attorney, Agent, or Firm*—S. Sherman

[57] ABSTRACT

This application discloses a class of amplifiers employing dual active elements connected between a pair of hybrid couplers. It is shown that, in one particularly useful special case, this basic circuit can be simplified, and the hybrid couplers replaced by simple 1:1 turns ratio transformers. It is an advantage of this class of amplifier that it can be matched to any arbitrary impedance at both its input and output ports while preserving all the preferred characteristics of the active elements.

12 Claims, 17 Drawing Figures

AMPLIFIER WITH INPUT AND OUTPUT IMPEDANCE MATCH

This application is a continuation-in-part of my copending application, Ser. No. 113,201, filed Feb. 8, 1971, now abandoned.

BACKGROUND OF THE INVENTION

It is a very common practice to employ amplifiers whose input and output impedances are significantly different than the impedances of the circuits to which they are connected. For example, an emitter follower transistor amplifier has, ideally, an infinite input impedance and zero output impedance. The transmission lines to which it is connected, on the other hand, may have an impedance of 50 ohms. While such an arrangement may be tolerated in some applications, in a communication system, however, such large mismatches tend to produce echoes and delay distortion effects and, hence, are to be avoided.

It is, accordingly, the broad object of the present invention to match the input and output impedances of an amplifier to its source and load impedance while fully preserving all the preferred characteristics of the amplifier.

SUMMARY OF THE INVENTION

An amplifier, in accordance with the present invention, comprises a pair of dual active stages connected between an input hybrid coupler and an output hybrid coupler. In a first embodiment of the invention, the mutually dual active stages are connected between a pair of 3 db couplers, where each active stage couples one branch of one pair of conjugate branches of the input coupler to a branch of one pair of conjugate branches of the output coupler. A third branch of each coupler constitutes, respectively, the input and output ports of the amplifier, while the fourth branch of each hybrid is connected to a resistor which match-terminates the coupler.

Recognizing that cascades of mutually dual elements are also mutually dual, a number of modifications are possible which significantly simplify the circuit. Applying this principle in a second embodiment of the invention using hybrid transformers, mutually dual current and voltage transformers are added in cascade with the respective active stages. By combining transformers, the input and output circuits reduce to simple 1:1 turns ratio transformers having center-tapped primary windings. Specifically, the lower input impedance active stage is connected to the center-tap of the input transformer and the lower output impedance active stage is connected to the center-tap of the output transformer. The higher input impedance active stage and the higher output impedance active stage are connected, respectively, to the input transformer secondary winding and to the output transformer secondary winding.

An input signal, applied at one end of the input transformer primary winding produces an amplified output signal at one end of the output transformer primary winding. The other ends of transformers' primary windings are terminated by means of matching impedances equal to the source and load impedances, respectively.

While the use of 3 db couplers is a convenient and in some instances a preferred arrangement, more generally, input and output couplers having any arbitrary characteristic impedance, and any arbitrary power division ratio can be used, as will be explained in greater detail hereinbelow.

It is an advantage of the present invention that the amplifier can be matched to any arbitrary impedance at both its input and output ports while preserving all the preferred characteristics of the active elements. In particular, the use of unity gain active elements, such as common base connected and common collector connected transistors, in conjunction with minimally complex impedance transforming networks, results in a highly stable, broadband amplifier.

It is a further advantage of the present invention that input match is achieved without affecting noise performance.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
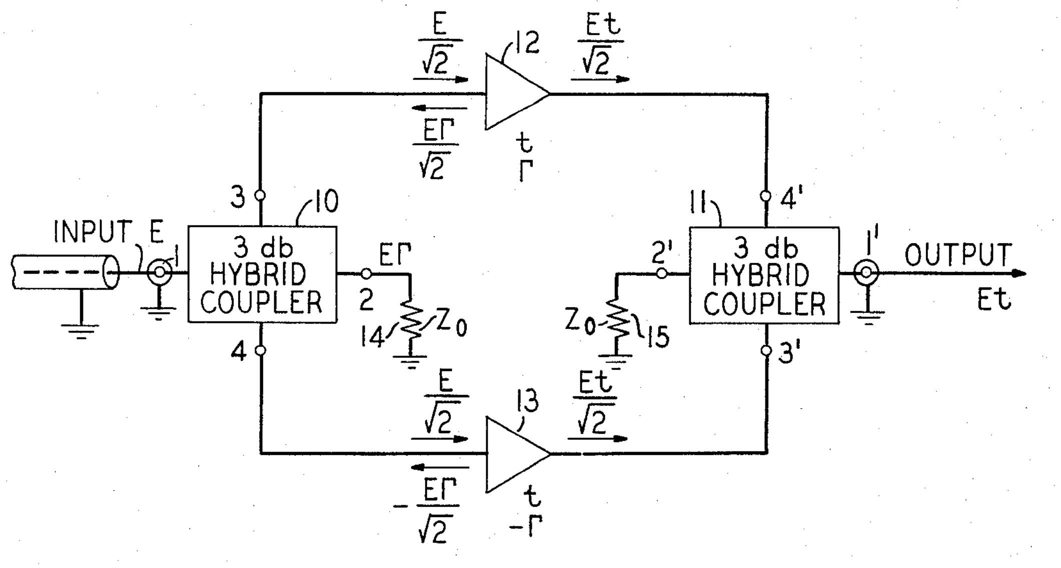
FIG. 1 shows, in block diagram, a first embodiment of the invention.

Referring to the drawings, FIG. 1 shows, in block diagram, a first embodiment of an amplifier in accordance with the invention comprising: an input 3 db hybrid coupler 10; an output 3 db hydrid coupler 11; and dual active stages 12 and 13 connected therebetween. Each of the couplers have four branches 1, 2, 3 and 4, and 1', 2', 3' and 4', arranged in pairs 1–2 and 3–4, and 1'–2' and 3'–4', where the branches of each pair are conjugate to each other and in coupling relationship with the branches of the other of said pairs. In addition, the coupled signals are either in phase or 180° out of phase. Examples of such devices are magic-T couplers and hydrid transformers.

Each of the active stages 12 and 13 comprises one or more active elements arranged such that one stage is the dual of the other. As such the coefficient of transmission for stage 12 is equal to the coefficient of transmission for stage 13, while the coefficients of reflection for the two stages are equal in magnitude but of opposite sign, or are zero. Specifically, the product of the input impedances of the two stages is equal to the square of the source impedance, and the product of the output impedances of the two stages is equal to the square of the load impedance. Devices of this kind will be described in greater detail hereinbelow.

As illustrated in FIG. 1, branch 1 of coupler 10 is the amplifier input port, and branch 1' of coupler 11 is the amplifier output port. Each active stage is connected between a different one of the branches of one pair of conjugate branches of each coupler. Thus, stage 12 is connected between branch 3 of conjugate branches 3–4 and branch 4' of conjugate branches 3'–4', while stage 13 is connected between branch 4 and branch 3'. Each of the remaining branches 2 and 2' is match-terminated by means of a resistor 14 or 15 whose impedance $Z_o$ is equal to the characteristic impedance of the system.

In operation, a signal E applied to branch 1 of input coupler 10 is divided into two equal components $E\sqrt{2}$ in branches 3 and 4. Because of their dual properties, equal signal components $$\frac{Et}{\sqrt{2}}$$

are transmitted by stages 12 and 13, and combine in 1' of output coupler 11 to produce an output signal Et.

The reflected components, $$\frac{E\Gamma}{\sqrt{2}} \text{ and } \frac{-E\Gamma}{\sqrt{2}}$$

however, because of their 180° phase difference, combine in branch 2 of coupler 10, and are dissipated in terminating resistor 14. Thus, none of the reflected energy appears at the amplifier input port 1.

A similar result is obtained with respect to a signal applied to branch 1' of coupler 11. Thus, all the energy reflected back to the amplifier is dissipated in the terminating resistor 15 connected to branch 2'. Accordingly, the amplifier shown in FIG. 1 is matched with respect to both its input and output ports. Thus, it will be noted, that while the active stages are embedded in a highly mismatched environment, the amplifier, as a whole, is nevertheless matched to its environment. Furthermore, this match is achieved without any degradation in noise performance since the noise energy associated with the match-terminating impedance 14 is coupled to impedance 15, with none of the noise reaching the amplifier output port 1'. The noise contributed by the active stages is similarly minimized because of the highly inefficient coupling between the equivalent noise generators and the amplifier input network due to the above-noted mismatch.

Figure 2A:
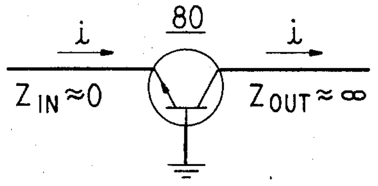
FIGS. 2A and 2B, included for purposes of illustration, shown transistors connected in a common base configuration and a common collector configuration, respectively.
Figure 2B:
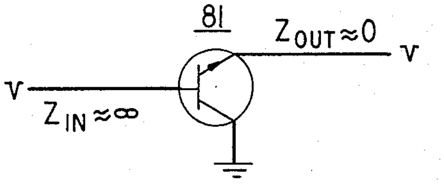

As indicated above, stages 12 and 13 have mutually dual characteristics. While dual passive elements and networks are well known, an amplifier requires dual active elements incorporated into dual networks. The present invention is based upon the recognition that certain configurations of active elements have this property. For example, a transistor 80 connected in the common base configuration, as illustrated in FIG. 2A, transforms a current $i$, with unity gain, from a low impedance to a low admittance. (That is, to within a good approximation, the input impedance $Z_{in}$ of a common base transistor is zero, and its output impedance $Z_{out}$ is infinite.) Conversely, a transistor 81 connected in a common collector configuration, as illustrated in FIG. 2B, transforms a voltage $v$, with unity gain, from a high impedance to a high admittance. (That is, to within an equally good approximation, the input impedance $Z_{in}$ of a common collector transistor is infinite and its output impedance $Z_{out}$ is zero.) This identity of language to characterize these circuits with but an interchange of voltage and current, and impedance and admittance, is precisely the definition of duality. Hence, transistors connected as illustrated in FIGS. 2A and 2b, are mutually dual active elements. Not only are they dual, but they are highly degenerative configurations having feedback factors of unity. As such, they lend themselves to bidual circuitry, producing composite amplifiers having an extremely stable, low distortion gain, that is virtually constant over very wide frequency and power ranges.

Figure 3:
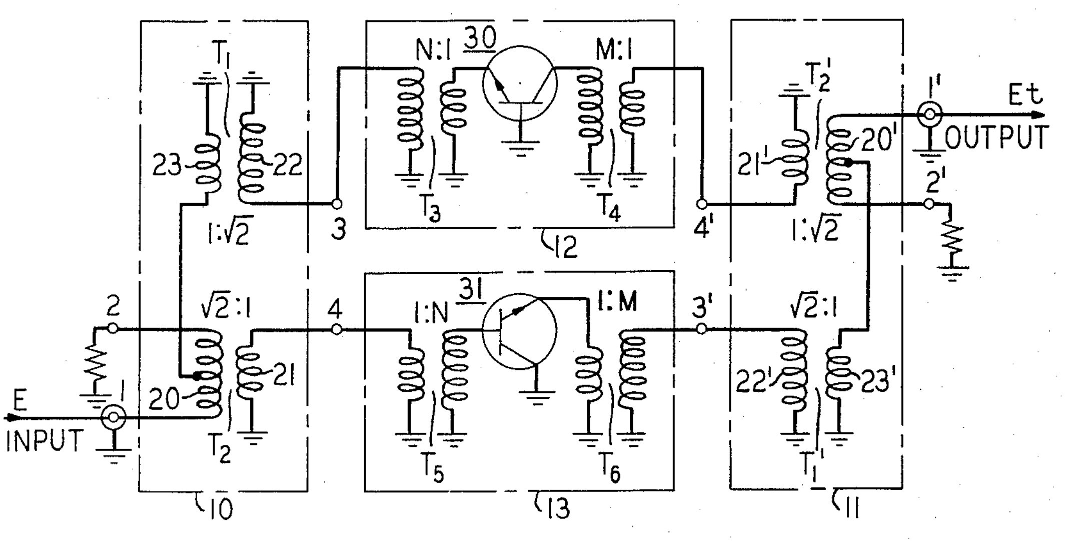
FIG. 3 shows a specific embodiment of the invention using hybrid transformers and transistors.

FIG. 3 illustrates a specific embodiment of the invention wherein couplers 10 and 11 are hybrid transformers and stages 12 and 13 include transistors connected in a common base configuration and in a common collector configuration, respectively. In order to simplify the diagram, only the signal portion of the transistor circuits are shown. The standard direct current biasing sources and associated circuitry have been omitted.

Coupler 10 includes two transformers $T_1$ and $T_2$, where $T_1$ comprises windings 22 and 23, having a turns ratio of $\sqrt{2}$:1, and transformer $T_2$ comprises windings 20 and 21, having the same turns ratio $\sqrt{2}$:1. One end of each of windings 21 and 22 is grounded. Their other ends constitute one pair of conjugate branches 3–4. Winding 23 is also grounded at one end, while its other end is connected to a center tap on winding 20. The ends of winding 20 constitute the other pair of conjugate branches 1–2. Similarly, coupler 11 includes two transformers $T_1'$ and $T_2'$, where $T_1'$ comprises windings 22' and 23', having a turns ratio $\sqrt{2}$:1, and transformer $T_2'$ comprises windings 20' and 21', having the same turns ratio $\sqrt{2}$:1. One end of each of windings 21' and 22' is grounded. Their other ends constitute one pair of conjugate branches 3'–4'. Winding 23' is also grounded at one end while its other end is connected to a center tap on winding 20'. The ends of winding 20' constitute the other pair of conjugate branches 1'–2'.

Active stage 12, connected between coupler branches 3 and 4' comprises, in cascade, an N:1 turns ratio input transformer $T_3$, a transistor 30 connected in a common base configuration, and an M:1 turns ratio output tranformer $T_4$. Similarly, active stage 13, connected between coupler branches 4 and 3' comprises, in cascade, a 1:N turns ratio input transformer $T_5$, a transistor 31 connected in a common collector configuration, and a 1:M turns ratio output transformer $T_6$.

As indicated hereinabove, transistor 30, in the common base configuration, and transistor 31, in the common collector configuration, are dual active elements.

Similarly, transformer $T_3$, having an N:1 turns ratio, and transformer $T_5$, having a 1:N turns ratio, are dual circuit elements, as are transformers $T_4$ and $T_6$. Thus, each stage comprises a cascade of circuit elements that are, respectively, the dual of the cascade of elements of the other stage. As such, each stage, as a whole, is the dual of the other. Thus, a signal E applied at amplifier input port 1 will be amplified as it traverses the amplifier and appears as an output signal Et at the amplifier output port 1'. In addition, as shown in connection with FIG. 1, the amplifier is matched at its input and output ports 1 and 1'. The overall amplifier gain for this amplifier is 2NM.

Figure 4:
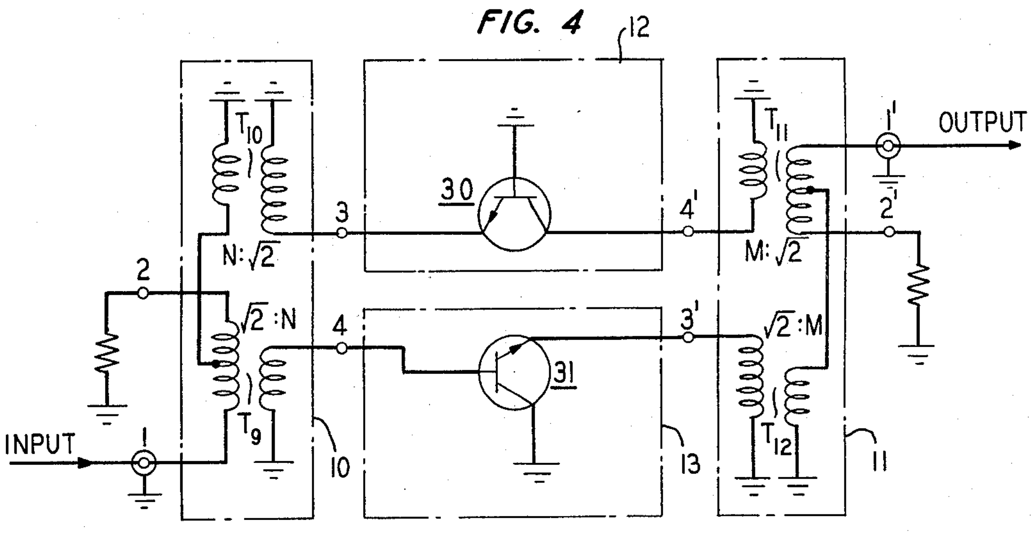
FIG. 4 shows a modification of the embodiment of FIG. 3.

Upon closer examination, it is apparent that certain simplifications can be made to the embodiment of FIG. 3. In particular, transformer pairs $T_1$–$T_3$, $T_2$–$T_5$, $T_4$–$T_2'$ and $T_6$–$T_1'$ can be combined and replaced by four transformers, as shown in FIG. 4. In this simplified embodiment, the transformers formerly included in the respective active stages are incorporated into one of the coupler transformers, as reflected in the modified turns ratios of the letter. Thus, coupler 10 now comprises two transformers $T_9$ and $T_{10}$ connected in the characteristic hybrid configuration. However, in this embodiment the transformer turns ratios are now N: $\sqrt{2}$. Similarly, the two transformers $T_{11}$ and $T_{12}$ in coupler 11 have M: $\sqrt{2}$ turns ratios.

Of particular interest is the special case where M = N = $\sqrt{2}$. When this condition is imposed, transformers $T_{10}$ and $T_{12}$ can be replaced by a simple conductive connection, and transformers $T_9$ and $T_{11}$ are reduced to simple 1:1 turns ratio transformers, yielding the very useful, but extremely simple amplifier configuration shown in FIG. 5.

Figure 5:
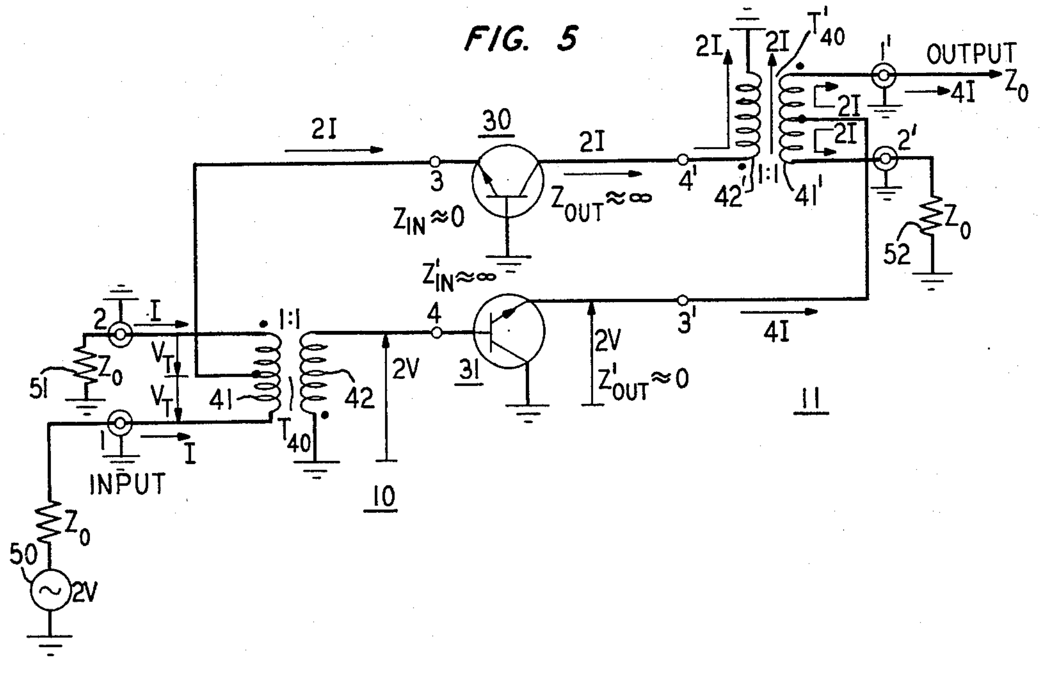
FIG. 5 is a further modification of the embodiment of FIG. 4.

In the embodiment of FIG. 5 couplers 10 and 11 comprise, respectively, a 1:1 turns ratio input transformer $T_{40}$ and a 1:1 turns ratio output transformer $T_{40}'$. One of the active stage is connected between a center tap on winding 41 of input transformer $T_{40}$, i.e., coupler branch 3, and one end of winding 42' on output transformer $T_{40}'$, i.e., coupler branch 4'. The other end of winding 42' is grounded. The other active stage is connected between one end of winding 42 of input transformer $T_{40}$, i.e., coupler branch 3, and a center tap on winding 41' of output transformerr $T_{40}'$, i.e., coupler branch 4'. The other end of winding 42 is grounded.

One end of winding 41, i.e., coupler branch 1, is the amplifier input port, while one end of winding 41', i.e., coupler branch 1', is the amplifier output port. The other ends of windings 41 and 41', i.e., coupler branches 2 and 2', are terminated, respectively by means of resistors 51 and 52.

In operation, a signal source 50, having an output impedance $Z_o$ and an open circuit voltage 2V, is connected to the amplifier input port 1. Ideally, transistor 30, comprising one of the active stages, has zero input impedance so that the center tap on winding 41 is at ground potential. Being a dual element, transistor 31, comprising the other active stage, has zero input admittance so that winding 42 is connected to an open circuit and, therefore, draws no current.

Accordingly, a first current-voltage equation can be written which relates the signal source voltage and source current as follows:

$$2V = IZ_o + V_T \qquad (1)$$

where I is the input signal current; and $V_T$ is the voltage across the lower half of winding 41, between input port 1 and the (grounded) center tap on winding 41.

Simultaneously, an equal voltage $V_T$ is induced in the upper half of winding 41 between the center tap and branch 2, producing an equal current I through resistor 51 given by $$V_T = IZ_o \qquad (2)$$

where resistor 51 has the same impedance as source 50. Substituting equation (2) in (1) we derive $$I = V/Z_o\,, \qquad (3)$$

which states that source 50 is feeding a matched load. We also derive that $$V_T = V \qquad (4)$$

so that the total voltage across winding 41 is 2V. Being a 1:1 turns ratio transformer, the voltage induced in winding 42, and applied to transistor 31, is also 2V. Similarly, the current coupled to transistor 30 is the sum of the currents into the opposite ends of winding 41 equal to 2I. Since both transistors have unity gain, the output current from transistor 30 is 2I and the output voltage from transistor 31 is 2V. The latter voltage is applied at the center tap of winding 41' to the parallel combination of outpupt load $Z_o$ and termination 52 which is equal to $Z_o$. The resulting current $I_o$ is thus $$I_o = \frac{2V}{Z_o/2} = 4\ \frac{V}{Z_o} \qquad (5)$$

Substituting for $(V/Z_o)$ from equation (3) we obtain $$I_o = 4I\,, \qquad (6)$$

half of which flows into the output load and half of which flows into termination 52. In addition, current 2I flowing through winding 42' induces an equal current in winding 41'. The two currents flow in the same direction and add constructively in the output load for a total output current of 4I. However, they flow in the opposite sense and add destructively in termination 52, reducing the net current in the termination to zero. Thus, the amplifier has a gain factor of 4 or 12 db.

Figure 6:
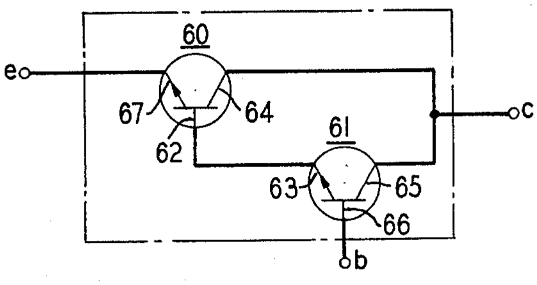
FIG. 6, included for purposes of illustration, shows two transistors arranged as a Darlington pair.

In the preceding explanation, transistors 30 and 31 have been idealized to have unity gain. In practice, however, the gain will be less than ideal and the overall amplifier gain will be, correspondingly, less than 12 db. To approach more nearly unity gain, a Darlington pair, as illustrated in FIG. 6, can be used. In this arrangement the base 62 of a first transistor 60 is connected to the emitter 63 of a second transistor 61. The two collectors 64 and 65 are connected together to from the collector *c* for the pair. The pair emitter *e* is the emitter 67 of transistor 60, while the pair base *b* is the base 66 of transistor 61. The gain factor $\alpha$ for the pair is then given as $$\alpha = \alpha_1 + (1 - \alpha_1)\,\alpha_2 \qquad (7)$$

where $\alpha_1$ and $\alpha_2$ are the gain factors for transistors 60 and 61, respectively. If, for example, $\alpha_1$ and $\alpha_2$ are both equal to 0.95, the $\alpha$ for the pair is then equal to 0.9975.

Figure 7A:
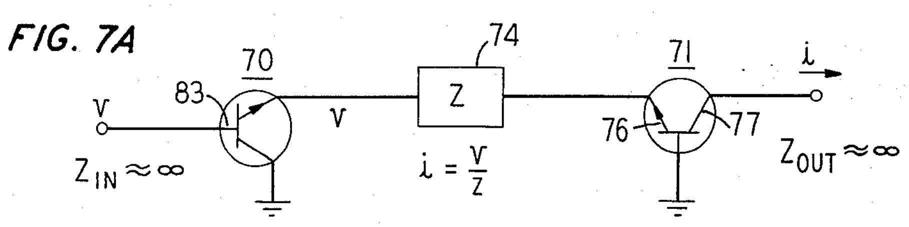
FIGS. 7A and 7B show a cascade of mutually dual elements to form a pair of mutually dual active stages including more than one active element each.
Figure 7B:
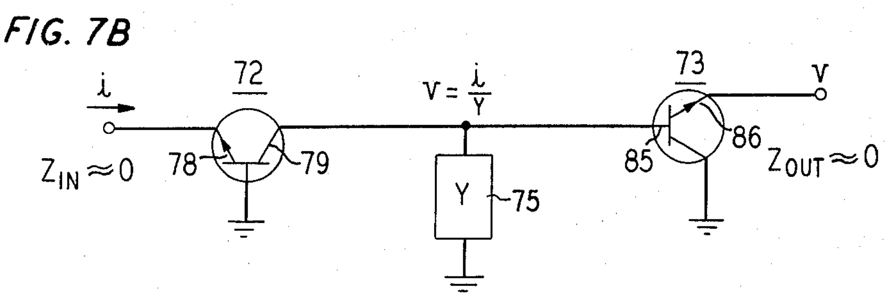

It was also indicated hereinabove that each active stage can include more than one active element and that the duality requirement is maintained if each element in each cascade has a dual counter-part in the other cascade. Such dual, multiple-element stages are illustrated in FIGS. 7A and 7B. In the former, there is cascaded a common collector transistor 70, a series impedance 74, and a common base transistor 71. In the latter there is cascaded a common base transistor 72, which is the dual of transistor 70, a shunt admittance 75, which is the dual of series impedance 74, and a common collector transistor 73, which is the dual of transistor 71. Since each of the respective elements are dual, the two cascades are likewise mutually dual.

In operation, a voltage $v$ applied to the base 83 of transistor 70 in FIG. 7A produces a voltage $v$ across impedance 74. This, in turn, causes a current $i = V/Z$ to flow into emitter 76 of transistor 61, producing an output current $i$ in collector 77.

In the embodiment of FIG. 7B, a current $i$ applied to the emitter 78 of transistor 72 causes a current $i$ to flow from collector 79 through admittance 75, producing a voltage $v = i/Y$ to appear at the base 85 of transistor 73. This, in turn, produces an equal output voltage $v$ at the emitter 86 of transistor 73.

Figure 8:
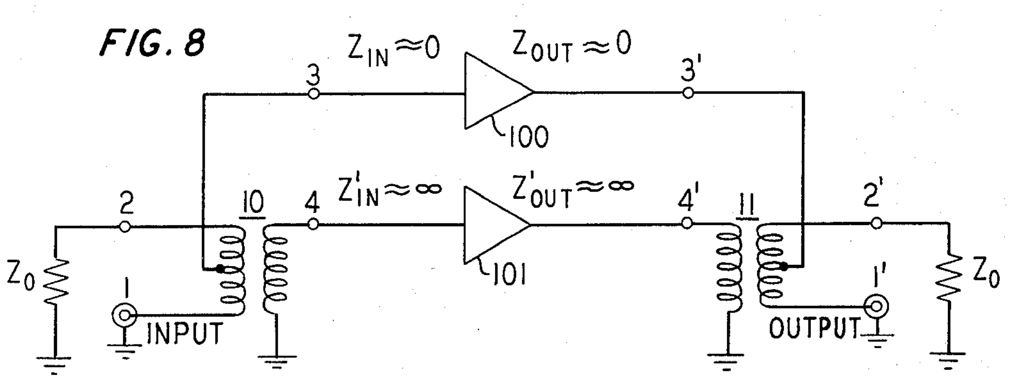
FIG. 8 shows an amplifier in accordance with the invention using dual active stages of the type disclosed in FIGS. 7A and 7B.

It will be noted that in each case of the circuits in FIGS. 7A and 7B, the input impedance $Z_{in}$ is equal to the output impedance $Z_{out}$, as distinguished from the active elements 30 and 31 in the embodiment of FIG. 5 wherein the elements have either a high input impedance and a low output impedance, or vice versa. Because of this difference, an amplifier comprising active stages of the type disclosed in FIGS. 7A and 7B, is slightly different than the amplifier disclosed in FIG. 5. The general rule for this embodiment is that the lower input impedance active stage is connected to the center tap of the input transformer primary winding, i.e., branch 3 of the input coupler, and the higher input impedance active stage is connected to one end of the input transformer secondary winding, i.e., branch 4 of the input coupler. Similarly, the lower output impedance stage is connected to the center tap of the output transformer primary winding, i.e., branch 3' of the output coupler, and the higher output impedance stage is connected to one end of the output transformer secondary winding, i.e., branch 4' of the output coupler. This is illustrated in FIG. 8 which shows an amplifier in accordance with the present invention utilizing a first active stage 100 whose input impedance $Z_{in}$ and whose output impedance $Z_{out}$ are essentially zero, and a second active stage 101 whose input impedance $Z'_{in}$ and whose output impedance $Z'_{out}$ are essentially infinite. Applying the rules set forth above, stage 100 is connected between branch 3 of input coupler 10 and branch 3' of output coupler 11, while stage 101 is connected between branches 4 and 4'.

In the discussion hereinabove, the active stages were characterized as being dual stages. This was done in order to develop a theoretical basis for an explanation of the operation of the amplifier. In practice, however, strict duality is not required. It is sufficient, for example, if the input impedances of the two active stages differ from the source impedance by an amount that is preferably an order of magnitude or more, and if their output impedances differ from the load impedance by an amount that is preferably an order of magnitude or more. Thus, referring to FIG. 8, mathematical duality is not required if $$Z_{in} << Z_o << Z'_{in} \tag{8}$$

and $$Z_{out} << Z_o << Z'_{out} . \tag{9}$$

A second requirement is that the two stages have the same gain. This gain can be uniform over the band of interest or can be shaped as a function of frequency. For example, in the active stages illustrated in FIGS. 7A and 7B, shaping can be effected by means of impedance 74 and admittance 75.

Referring again to FIG. 5, it will be noted that while each of the active stages 30 and 31 delivers equal power to the output load, the distributin of voltage and current for the last two stages bear a dual relationship. Specifically, the output current from stage 30 is 2I amperes at 4V volts for an output power of 8IV. On the other hand, the output current from stage 31 is 4I amperes at 2V volts for an output power that is also equal to 8IV. The total power from the two stages is, therefore, equal to 16IV. This, of course, is equal to the power, P, delivered to the output load which, from FIG. 5, is given by $$P = (4I)^2 Z_o = 16I^2 Z_o = 16IV . \tag{10}$$

Because of the different output drive conditions noted above, each of the active stages must be biased differently. This would require separate power supplies or, alternatively, a common power supply with a consequent inefficiency produced by the need for bleeder power to establish the disparate operating conditions. If, however, all of the active elements comprising the dual stages are conceived to operate in units of 2V volts and 2I amperes, stage 30 can be realized by a series connection of two such elements and stage 31 can be realized by a parallel connection of two such elements. While this would result in the use of four elements in place of two, the diminution of bleeder power and the increase in maximum power capability make this somewhat more complex embodiment nevertheless attractive.

The parallel and series connecting of transistors can be achieved in a variety of ways. However, for operation at the higher frequencies, for which the present invention is particularly adapted, special care must be taken that the time delays through all the wavepaths are properly equalized. Most circuits do not inherently provide such equalization and would, therefore, require most careful investigation and, generally, some modification to balance the time delays. To avoid this, the embodiment of FIG. 9, now to be described, is especially conceived to provide time delay equalization as an inherent characteristic. As illustrated, this embodiment of an amplifier, in accordance with the present invention, comprises, as in FIG. 1, an input hybrid coupler 90 and an output hybrid coupler 91, interconnected by means of a pair of dual active stages 88 and 89. However, the couplers are six branch couplers of the type described in U.S. Pat. No. 3,325,587, rather than four branch couplers. In particular, the couplers, as shown in FIG. 2 of the above-identified patent, comprise six identical sections of two-conductor transmission line of arbitrary length, connected internally as described in said patent. In the more usual hybrid coupler, the branches are arranged in pairs 1–2 and 3–4, where the branches of each pair are conjugate to each other and in coupling relationship with the branches of the other of said pairs. This is equally so with respect to couplers 90 and 91, except that each of the branches of one pair of branches, 3 and 4, are divided into two subbranches *3a*, *3b* and *4a* and *4b*, respectively. Thus, in this six-branch coupler, a signal coupled to either branch 1 or 2, is divided equally among the four subbranches *3a*, *3b*, *4a* and *4b*. In all other respects the operation of these couplers is the same as the standard four-branch coupler.

As indicated above, the line sections in each coupler are connected as described in the above-identified patent. Briefly, the internal end of one of the two conductors 120 of line section 92, comprising coupler branch 1, is connected in series with line section 97, (comprising subbranch *3b*), to the interior end of one of the conductors 121 of line section 93, (comprising coupler branch 2). The interior end of the other conductor 122 of section 92 is connected in series with line section 96, (comprising subbranch *3a*), to the interior end of the other conductor 123 of line section 93. The interior end of conductors 124 and 125 of line section 94, (comprising subbranch *4a*), are connected to conductors 120 and 123, respectively, while the interior ends of conductors 126 and 127 of line section 95, (comprising subbranch *4b*), are connected to conductors 122 and 121, respectively. The internal connections of the output coupler 91 are identical to those of input coupler 90. For ease of comparison, the identification numerals used in the input coupler, are primed and used to identify corresponding portions of the output coupler.

In accordance with this embodiment of the invention, the exterior ends of line sections 94 and 95 of input coupler 90, and the exterior ends of line sections 94′ and 95′ of output coupler 91 are connected in series such that the voltages appearing there are added in phase. So connected, they constitute port 4 of input coupler 90, and the corresponding port 4′ of the output coupler 91.

The external ends of line sections 96 and 97, and 96′ and 97′, on the other hand, are connected in parallel such that the currents in the two line sections add in phase. So connected, they constitute port 3 and port 3′ of the respective couplers. The external ends of line sections 92 and 93, and 92′ and 93′ constitute the remaining ports 1 and 2, and ports 1′ and 2′ of the respective couplers.

With the four ports thus identified, the amplifier is organized as described in connection with FIG. 1 or FIG. 5. That is, a signal source 110 having an internal impedance $Z_o$ equal to the characteristic impedance of the line sections, and an open-circuit voltage 2V, is connected to port 1 of the input coupler 90. Port 2 of coupler 90, and ports 1′ and 2′ of coupler 91 are match-terminated by means of impedances 111, 112 and 113, where one of the latter two impedances constitutes the useful load.

Port 4 of coupler 90 is connected to the input terminal of active stage 88 which, in this embodiment comprises the two parallel-connected transistors 106 and 107, each of which is connected in the common collector configuration. The output terminal of stage 88 is connected to port 3′ of coupler 91.

Port 3 of coupler 90 is connected to the input terminals of active stage 89 comprising the two series-connected transistors 104 and 105, each of which is connected in the common base configuration. The output terminals of stage 89 are connected to port 4′ of coupler 91.

In operation, signal source 110, connected at port 1, produces a signal of 2V volts at port 4 and a signal of 2I amperes at port 3. The 2V volt signal is applied to the parallel-connected base electrodes of transistors 106 and 107 in phase, to produce a 2V volt output signal at the output terminal of stage 88. The 2I ampere signal at port 3 is applied to the emitter electrodes of transistors 104 and 105. Specifically, the signal current flows into transistor 104 and, simultaneously out of the emitter of transistor 105. Thus, the transistors are excited 180 degrees out of phase. Similarly, the collector currents produced as a result are coupled into the two conductors of port 4′ out of phase.

The signals applied to ports 3′ and 4′ induce equal, in phase components in impedance 113, for a total of 4I amperes, while inducing equal, but oppositely-phased signal components in impedance 112, which sum to zero. Thus, in all its external characteristics, the embodiment of FIG. 9 and the embodiment of FIG. 5 are the same. However, whereas the single transistor used in stage 31 of FIG. 5 delivered a total current of 4I amperes at 2V volts, in the embodiment of FIG. 9 the two transistors in stage 88 share the load equally, each delivering 2I amperes at 2V volts. Similarly, whereas the transistor in stage 30 in FIG. 5 delivered a current of 2I amperes at 4V volts, the voltage is divided between the series-connected transistors 104 and 105 in stage 89 of FIG. 9, such that each supplies the 2I amperes at 2V volts. Thus, the four transistors operate over the exact same dynamic range of 2I amperes and 2V volts and, hence, can be biased more efficiently by means of a common power source. Furthermore, while four transistors are used instead of the two used in FIG. 5, the overall power capability of the amplifier can be increased proportionatly or, for the same output power, smaller transistors can be used.

Figure 10:
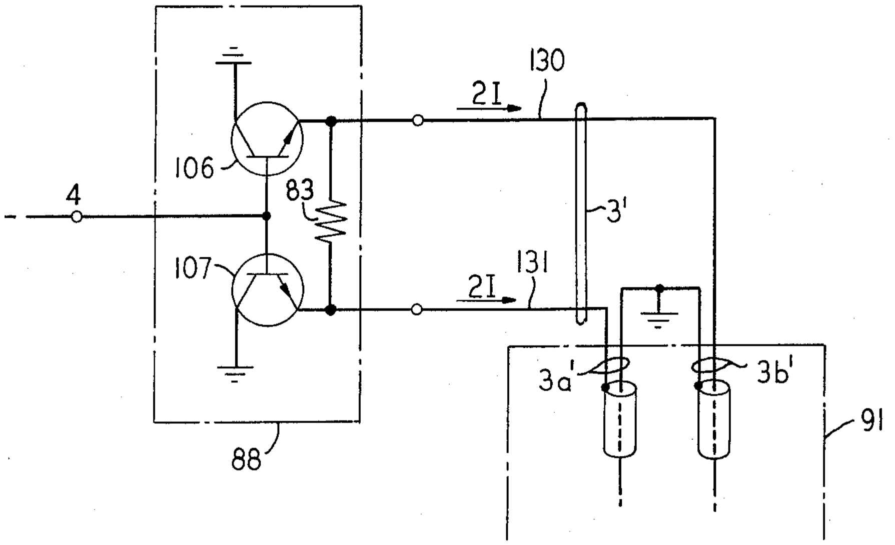
FIG. 10 shows a modification in the connection of one of active stages of FIG. 9.
Figure 9:
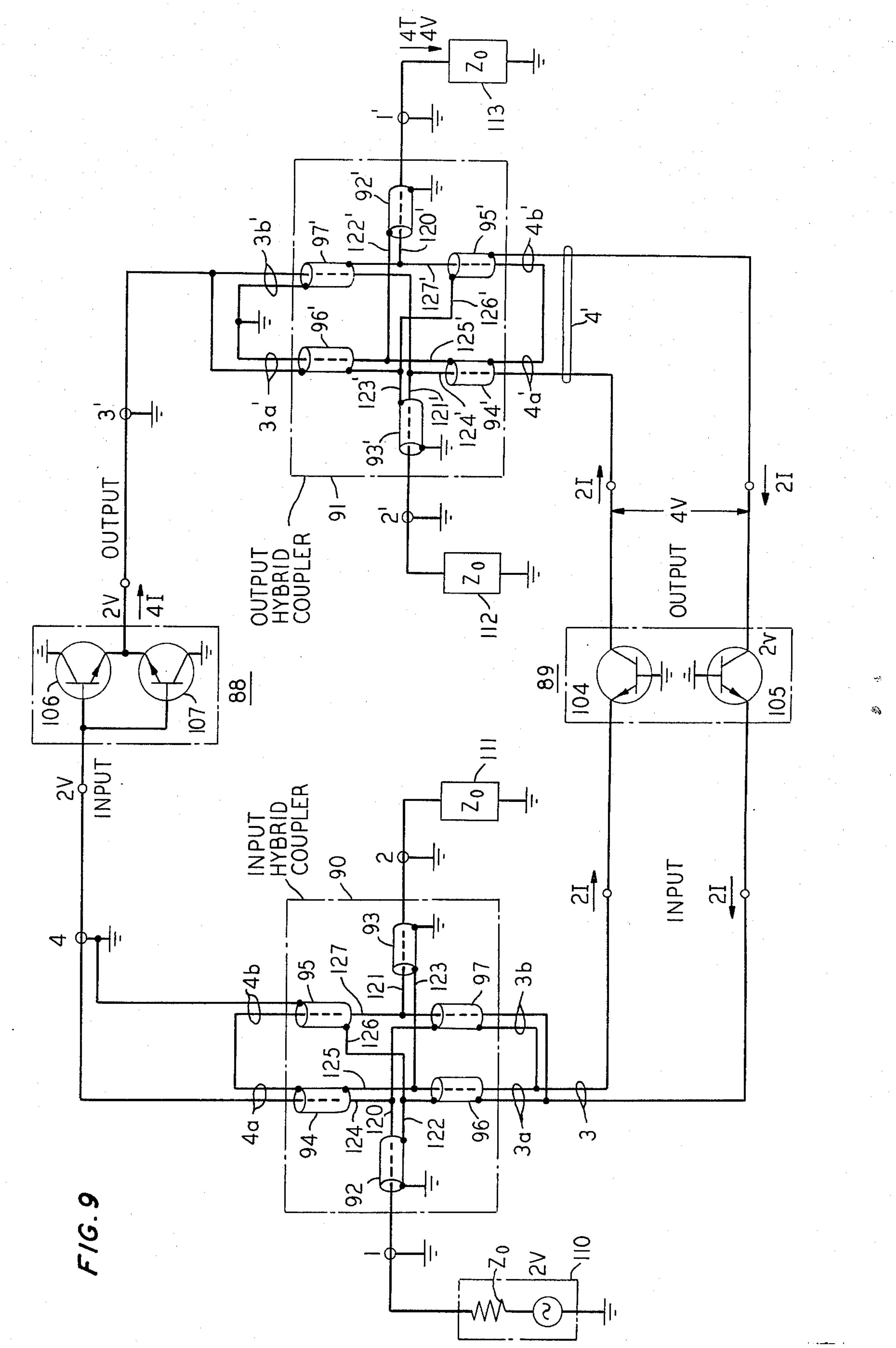
FIG. 9 shows an embodiment of the invention employing series and parallel connected active stages.

In a practical embodiment, a slight modification of the amplifier illustrated in FIG. 9 is advantageously made. In general, it is not good practice to connect very low impedance circuits in parallel, as is done in stage 88 wherein the two emitter electrodes are connected together. Furthermore, since this paralleling connecting is not really necessary in that the currents combined thereby are divided again in the two subbranches *3a′* and *3b′* of output coupler 91, the alternate connection illustrated in FIG. 10 is recommended. This figure shows a portion of the amplifier of FIG. 9, including active stage 88 and subbranches *3a′* and *3b′* of output coupler 91. However, in this arrangement the emitters of transistors 106 and 107 are not connected together but, instead, separate connections 130 and 131 are made between the respective transistors and subbranches *3a′* and *3b′*. A parasitic suppressor resistor 83 is advantageously connected between emitters. Since the currents into the two subbranches are the same in either case, there is no difference in the operation of the amplifier. However, in FIG. 10 the two, low impedance emitter circuits are not actually connected in parallel.

In addition to equalizing the biasing requirements of the transistors, the use of transmission line lengths in the embodiment of FIG. 9 to form the hybrid couplers, instead of the more conventional type of transformers, has the effect of greatly extending the bandwidth of the amplifier. However, since these two advantages are independent of each other, one can realize both advantages or either advantage alone. Thus, for example, one can obtain the bandwidth advantage without the biasing advantage by using the couplers shown in FIG. 9, but only one transistor per stage. This would simply involve the omission of one transistor per stage, i.e., the omission of transistor 107 from stage 88; and the omission of transistor 105 from stage 89, and the grounding of coupler subbranches *3a* and *4b'*.

In the various illustrative embodiment described hereinabove, 3 db hybrid couplers were used wherein the incident signal was divided equally between the coupled branches. While this has the advantage that the power delivered to the output load is shared equally by the two active stages, and the operation of the amplifier is independent of the nature of the reflection coefficients Γ and −Γ at the terminals of the active stages, it does, however, represent the very special case where the magnitudes of the coupling coefficients $t$ and $k$ for the two hybrid couplers are equal. That is $$|t| = |k| . \tag{11}$$

In the more general case, however, $t$ and $k$ can have any values consistent with the requirement that $$|t^2| + |k^2| = 1 . \tag{12}$$

Figure 11:
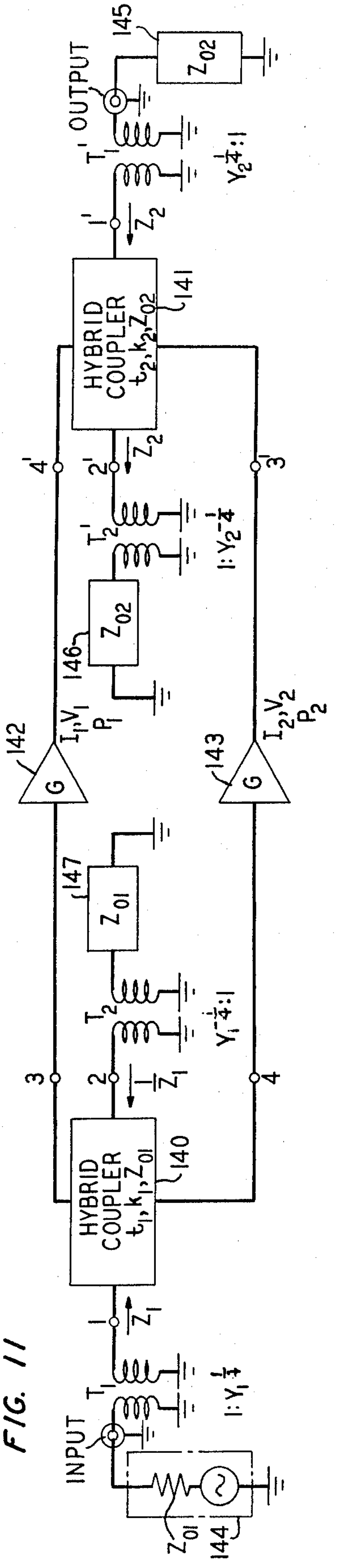
FIG. 11 shows, in block diagram, an amplifier in accordance with the present invention using couplers having unequal power division ratios.

FIG. 11, now to be considered, illustrates the present invention using two different couplers having any arbitrary power division ratios. In this embodiment, the input coupler 140 has a coefficient of coupling $t_1$ between ports 1–3 and 2–4, and a coefficient of coupling $k_1$ between ports 1–4 and 2–3. The output coupler 141 is characterized by coupling coefficients $t_2$ and $k_2$ between corresponding ports. Dual active stages 142 and 143 are connected respectively between ports 3–4' and 4–3' of the couplers.

In the equal power division case described hereinabove, the reflection components produced at the inputs to the two active stages cancel exactly in the coupler input port. In the case of unequal power division, now to be considered, the reflection components do not cancel, leaving a net residual component. If, however, the reflection coefficients are real, and there are no significant reactive components in the input circuit, the residual component of reflection can always be canceled by means of a simple transformer. Accordingly, in the more general case, signal source 144, having an output impedance $Z_{01}$, is coupled to port 1 of coupler 140 through a transformer $T_1$, and a match-terminating impedance 147 is coupled to port 2 of coupler 140 through a transformer $T_2$. Similarly, at the amplifier output end, an output load 145 of magnitude $Z_{02}$ and a match-terminating impedance 146 are connected to ports 1' and 2' of output coupler 141 by means of transformers $T_1'$ and $T_2'$.

It can be shown that the input impedance $Z_1$ at port 1 of coupler 140, and the input impedance $Z_1'$ at port 2 are given by $$Z_1 = Z_{01}\sqrt{Y_1} \tag{13}$$

and $$Z_1' = \frac{1}{Z_{01}\sqrt{Y_1}} \tag{14}$$

where $$Y_1 = \frac{1 + \Gamma_1^2 + 2\Gamma_1 \cos 2\Theta_1}{1 + \Gamma_1^2 - 2\Gamma_1 \cos 2\Theta_1}; \tag{15}$$

$\Gamma_1$ is the reflection coefficient at the input of the active stage coupled to port 3, i.e., stage 142;

and $\theta_1$ is related to the coupler coefficients $t_1$ and $k_1$ by $$\theta = \cos^{-1} t_1 = \sin^{-1} k_1. \tag{16}$$

It will be noted from equation (15) that for a 3 db coupler, $\theta_1 = 45°$, and $Y_1 = 1$. Hence $Z_1$ is equal to $Z_{01}$ regardless of the value of $\Gamma_1$. In the more general case, however, where $\theta_1 \neq 45°$, $Z_1$ is a function of $\Gamma_1$ and is real only if $\Gamma_1$ is real, and is complex if $\Gamma_1$ is complex. Since signal generators and transmission lines typically have real characteristic impedances, it would be necessary in the case of complex reflection coefficients to synthesize a matching network in order to match the signal source to the impedance at port 1. While this can be done, it tends to have a bandlimiting effect upon the amplifier.

For the case of amplifiers having essentially real terminal impedances, $Z_1$ is real, and coupler 140 can be matched at ports 1 and 2 by connecting a source having a real impedance $Z_1$ at port 1, and a real matching impedance $1/Z_1$ at port 2. Alternatively, simple impedance-matching transformers having turns ratios $$1:Y_1^{1/4} \text{ and } 1:Y_1^{-1/4} \tag{17}$$

can be used in conjunction with a source and a termination having equal impedance of $Z_{01}$. This latter arrangement is illustrated in FIG. 11, wherein transformer $T_1$, having a turns ratio $1:Y_1^{1/4}$, couples signal source 144 to coupler port 1, and transformer $T_2$, having a turns ratio $1:Y_2^{-1/4}$, coupled impedance 147 to port 2.

Similarly, the impedances $Z_2$ and $Z'_2$ at 1' and 2' of output coupler 141 are given by equations (13), (14), (15) and (16), using the appropriate parameters $t_2$, $k_2$, $\Gamma_2$ and $Z_{02}$. Accordingly, transformers $T'_1$ and $T'_2$, having turns ratios $$1:Y_2^{1/4} \text{ and } 1:Y_2^{-1/4} \tag{18}$$

are used with equal impedances 145 and 146 to terminate ports 1' and 2' of the output coupler.

Whereas the power delivered to the output load is shared equally by the two active stages in the embodiment of FIG. 1, the power, current and voltage distributions in the embodiment of FIG. 11 is a function of the input and output coupler, as given by $$I_1 = -G\sqrt{\frac{2}{\sin 2\Theta_2}}; \tag{19}$$

$$V_1 = -G\tan\Theta_1 \sqrt{\frac{2}{\sin 2\Theta_2}}; \quad (20)$$

$$P_1 = \frac{2G^2}{\sin 2\Theta_1} \cdot \tan\Theta_1; \quad (21)$$

$$I_2 = \frac{G}{\tan\Theta_1} \sqrt{\frac{2}{\sin 2\Theta_2}}; \quad (22)$$

$$V_2 = G\sqrt{\frac{2}{\sin 2\Theta_2}}; \quad (23)$$

and $$P_2 = \frac{2G^2}{\sin 2\Theta_2} \cdot \cot\Theta_1; \quad (24)$$

where

G is the stage voltage gain;

$\theta_1 = \cos^{-1} t_1$;

and $\theta_2 = \cos^{-1} t_2$.

Figure 12:
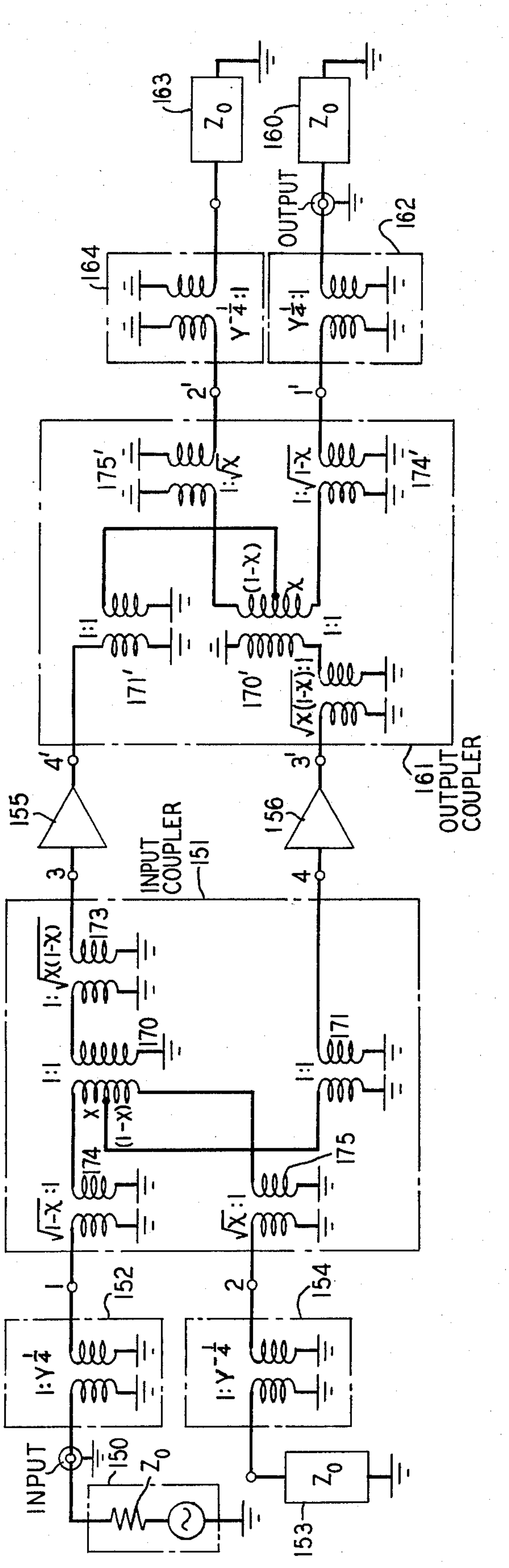
FIG. 12 shows the amplifier of FIG. 11 using hybrid transformers as input and output couplers.

FIG. 12 is illustrative of an embodiment of the invention using generalized hybrid transformers as couplers. At the input end, a signal source 150 is coupled to port 1 of input coupler 151 through an impedance-matching transformer 152. A terminating impedance 153 is coupled to port 2 of coupler 151 through impedance-matching transformer 154. Port 3 of coupler 151 is coupled to an active stage 155, and port 4 is connected to a dual active stage 156.

At the output end, stage 155 is connected to port 4' of output coupler 161, and stage 156 is connected to coupler port 3'. Coupler ports 1' and 2' are coupled to match-terminating impedances 160 and 163 through impedance-matching transformers 162 and 164, respectively.

The couplers themselves comprise five transformers each. Referring to the input coupler (the output coupler being identical) two of the transformers, 170 and 171, are 1:1 turns ratio transformers. Of these, one end of both windings of transformers 171 are grounded. Arbitrarily designating the left winding of each transformer as the "primary" winding and the right winding as the "secondary" winding, the other end of the secondary winding of transformer 171 constitutes port 4 of coupler 151. The other end of the primary winding is connected to a tap on the primary winding of transformer 170. The tap, as indicated, divides the primary turns in the proportion of $x : 1-x$. The ends of this primary winding are coupled, respectively, to ports 1 and 2 of the input coupler through transformers 174 and 175. The secondary winding of transformer 170 is grounded at one end, and the other end is coupled to coupler port 3 through transformer 173.

With the tap dividing the turns of the primary winding of transformer 170 in the ratio of $x$ to $1-x$, the coupling coefficients $t_1$, between ports 1–3 and 2–4, and the coupling coefficient $k_1$, between ports 1–4 and 2–3, and the parameter Y are given by $$t_1 = \cos\theta_1 = \sqrt{x} \quad (25)$$

$$k_1 = \sin\theta_1 = \sqrt{1-x} \quad (26)$$

and $$Y = \frac{1+\Gamma^2+2\Gamma(2x-1)}{1+\Gamma^2-2\Gamma(2x-1)} \quad (27)$$

where $0 < x < 1$. The primary to secondary turns ratio of transformers 173, 174 and 175 are 1: $\sqrt{x(1-x)}$; $\sqrt{1-x}$ :1, and $\sqrt{x}$ : 1. With ports 3 and 4 terminated by dual impedances, the turns ratios of impedance-matching transformers 152 and 154 are, as explained hereinabove in connection with FIG. 11, given by $$1{:}Y^{1/4} \text{ and } 1{:}Y^{-1/4}$$

Arbitrarily designating the right winding in each of the transformers of the output circuit as the primary winding, and the left winding as the secondary winding, and using the same identification numerals primed, the output circuit comprising coupler 161 and impedance-matching transformers 162 and 164, is seen to be identical to the input circuit.

Figure 13:
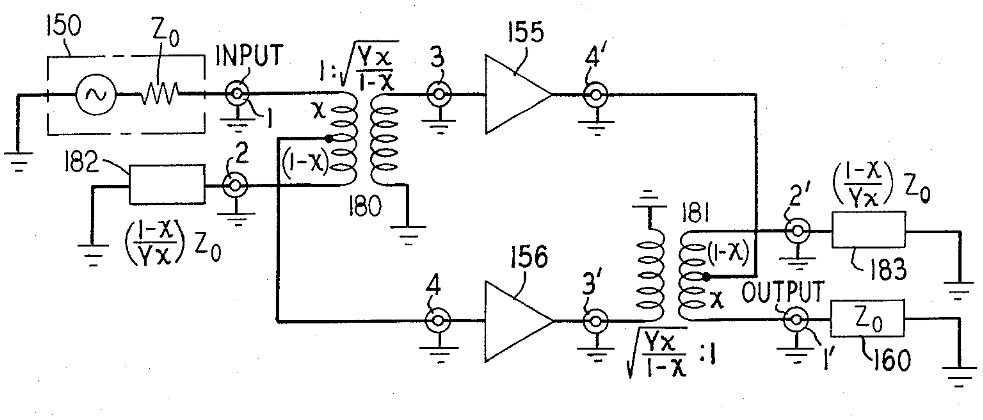
FIGS. 13, 14 and 15 show various specific embodiments of the amplifier of FIG. 12 derived by combining the impedance-matching transformers and the hybrid coupler transformers in a number of different ways.
Figure 14:
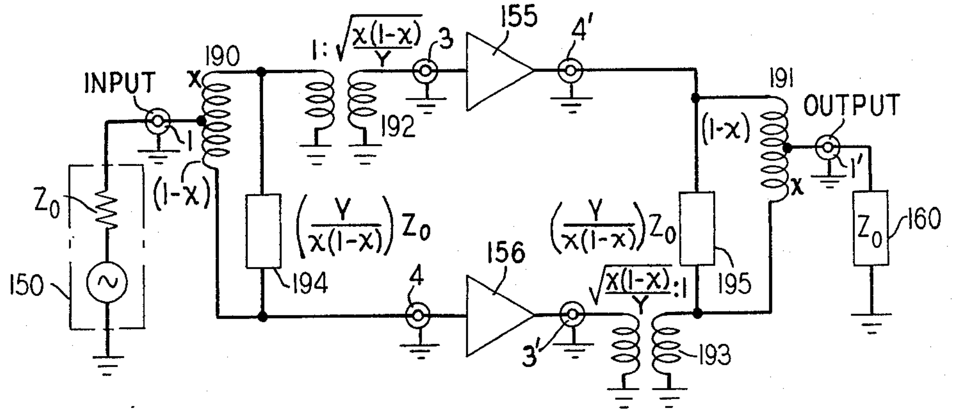
Figure 15:
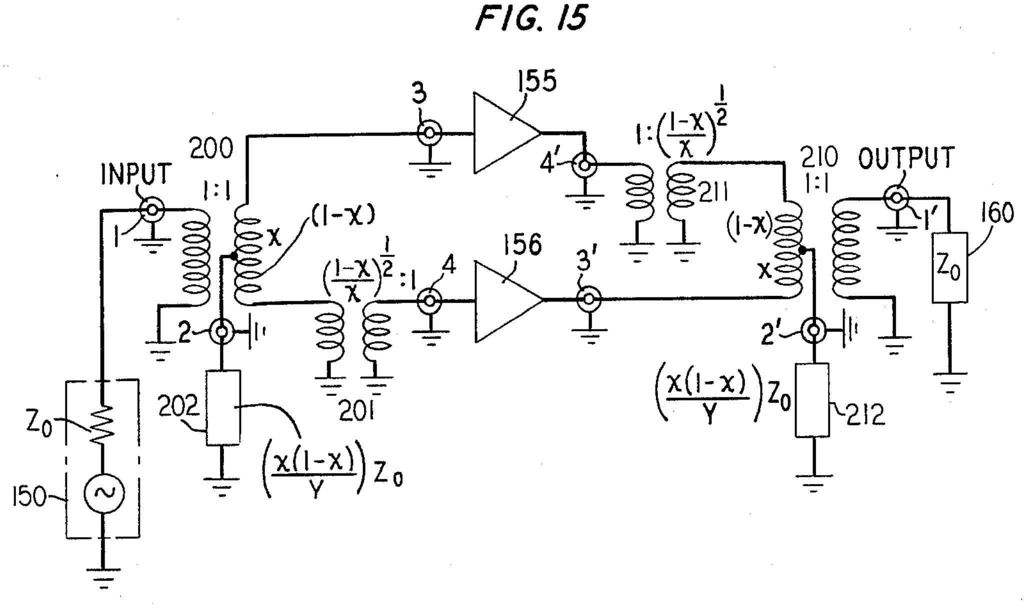

As was done with FIG. 3, the various transformers can be combined in a variety of ways. FIGS. 13, 14 and 15, now to be described, are illustrative of some of the simplified circuits that are obtained when the transformers comprising couplers 151 and 161, and the impedance-matching transformers 152, 154, 162 and 164 are combined in three of these various different ways. For example, in the embodiment of FIG. 13, both the input and output circuits simplify to a single transformer (i.e., 180 and 181) having a $$1 : \sqrt{\frac{Yx}{1-x}}$$

turns ratio. At the input end, signal source 150, having an output impedance $Z_o$, connects to one end of the primary winding of transformer 180, identified as port 1. The other end of the primary winding, identified as port 2, is connected to a match terminating impedance 182 having a magnitude $$\left(\frac{1-x}{Yx}\right)Z_o.$$

The secondary winding of transformer 180, identified as port 3 is connected to stage 155. Port 4, connected to the dual stage 156, is derived from the tap on the primary winding of transformer 180.

The output circuit is identical to the input circuit, with the corresponding ports 1', 2', 3' and 4' coupled to impedances of the same magnitude as those coupled to ports 1, 2, 3 and 4 of the input circuit. Thus, port 1' is connected to load impedance 160 of magnitude $Z_o$, while port 2' is connected to impedance 183 of magnitude $$\left(\frac{1-x}{Yx}\right)Z_o.$$

Port 3' is connected to the output terminal of one of the active stages 156, and port 4' is connected to the output terminal of the other active stage 155.

In operation, a signal applied to input port 1 is amplified, and the amplified signal coupled to output port 1', with none of the signal going to matching impedance 183.

In the particular case for which the magnitude of the reflectivity coefficient at the terminals of the active stages is unity ( $|\Gamma| = 1$), as in the case for transistors connected in the common base configuration illustrated in FIG. 2A, and in the common collector configuration illustrated in FIG. 2B, the parameter Y reduces to $$Y = \frac{x}{1-x}. \quad (28)$$

Substituting this value for Y in the impedance and turns ratio expressions for the amplifier illustrated in FIG. 13, we obtain for the matching impedances 182 and 183

$$\left(\frac{1-x}{x}\right)Z_0,$$

and for the transformer turns ratios $$1 : \left(\frac{x}{1-x}\right).$$

It will be noted that in the special case where $x = 0.5$, the tap is located at the center of the primary winding of transformers 180 and 181, and the circuit of FIG. 13 reduces to that of FIG. 5.

In the embodiment of FIG. 14, signal source 150 is coupled to a tap on an autotransformer 190, dividing the transformer winding in the ratio of $x$ to $1-x$. The lower end of the autotransformer is connected to active stage 156. The upper end of the autotransformer is coupled to active stage 155 through a transformer 192 having a $$1 : \sqrt{\frac{x(1-x)}{Y}}$$

turns ratio. A matching impedance 194 of magnitude $$\left(\frac{Y}{x(1-x)}\right)Z_0$$

is connected across the autotransformer.

It will be noted that the input coupling network in this embodiment is a three port network wherein port 1, the tap on transformer 190, is connected to the signal source; port 3, the secondary winding of transformer 192 is connected to one active stage; and port 4, the lower end of autotransformer 190 is connected to the lower other active stage. Port 2, to which the matching impedance 194 would normally be connected, is embedded within the autotransformer.

The output circuit, which is identical to the input circuit, comprises autotransformer 191, a shunt connected impedance 195, and transformer 193. Output load 160 is connected to port 1′ of the network, i.e., the tap along the autotransformer. Port 4′, the upper end of transformer 191, is connected to active stage 155, and port 3′, the secondary winding of transformer 193, is connected to active stage 156.

In the particular case where the magnitude of the reflectivity coefficients at the terminals of the active stages is unity, the magnitude of matching impedances 190 and 195 reduce to $$\frac{1}{(1-x)^2}Z_0,$$

and the turns ratio of transformers reduces to 1 : (1-$x$).

In the embodiment of FIG. 15, signal source 150 is coupled to the primary winding of a 1:1 turns ratio transformer 200. One end of the transformer secondary winding, i.e., port 3, is connected to active stage 155. The other end of the transformer secondary winding is coupled to active stage 156, through a transformer 201 having a $$\left(\frac{1-x}{x}\right)^{1/2} : 1$$

turns ratio. A match-terminating impedance 202, of magnitude $$\left(\frac{x(1-x)}{Y}\right)Z_0,$$

is connected to a tap on the secondary winding of transformer 200. In this embodiment the input circuit has four external ports. Similarly, the output circuit, comprising transformers 210 and 211, and impedances 212 and 160, connected in the same manner as the input circuit, also has four external ports.

In the particular case of $|\Gamma| = 1$, the magnitude of impedances 202 and 212 is $(1-x)^2Z_0$. Since the turns ratio of transformers 201 and 211 are independent of Y, they remain the same.

It will be recognized that the amplifier circuits shown in FIGS. 13, 14 and 15, are merely illustrative of the many specific embodiments that can be derived from the generic circuit of FIG. 11. The exact form of the specific circuit depends entirely on the coupler representation, and the manner in which the coupler transformers and the impedance-matching transformers are combined. Thus starting with the circuit of FIG. 12, the three circuits illustrated in FIGS. 13, 14 and 15 were derived. In general, all such derived circuits are characterized by multiport transformer input and output coupling networks which couple the two active stages to a common signal source and to a common output load, and provide a fourth port for an impedance matching load. In some configurations as, for example, FIG. 14, the fourth port may be embedded within the network.

The class of specific amplifiers that can be derived is further extended for the special case wherein the terminal impedances of the active stages are open and short circuits, within the meaning of those terms as explained hereinabove. This comes about, in the first instance, because it permits interconnections that would otherwise not be possible. For example, a transformer winding, otherwise connected to ground in the case of active stages having finite terminal impedances, can be connected to a terminal of the active stage having a short circuit terminal impedance. Obviously, a different looking circuit will emerge as a result of this.

In addition, circuit elements become commutative under certain conditions. As was previously noted, mutually dual circuits retain their overall duality as additional, mutually dual elements are added to the respective circuits. In general, the cascade of elements comprising the individual active circuits are not commutative. That is, the relative position of the cascade of elements cannot be changed in one of the active circuits without a corresponding change in the relative positions of the related elements in the other circuit. There is, however, one exception. In the special case where the input and output terminal impedances of elements in a cascade of dual elements are either open or short circuits, such elements and any next adjacent transformers are commutative. This permits further simplification of some of the amplifier circuits. For example, consider the embodiments of FIGS. 13, 14 and 15 wherein the active stages 156 and 155 are transistors connected as in FIGS. 2A and 2B. In the embodiment of FIG. 14, one active branch includes, in cascade, transformer 192 and stage 155. In the other active branch, the order of the cascade of elements is reversed, including first stage 156 and then transformer 193. However, if the terminal impedances of stages 155 and 156 are essentially open or short circuits, the overall duality of the two circuits is not affected by interchanging the relative positions of the active stages and the transformers. Thus, for example, the impedance connected at the lower end of input autotransformer 190 remains essentially a short circuit, and the impedance connected at the lower end of autotransformer 191 remains essentially an open circuit whether viewed through transformer 193 or viewed directly at the terminals of active stage 156. Thus, moving transformer 193 from between stage 156 and autotransformer 191, as shown in FIG. 14, and placing it in a position between autotransformer 190 and stage 156 will not impair the operation of the amplifier.

When this commutation is performed, and it is further noted that transformers 192 and 193 are themselves dual elements (i.e., have inverse turns ratios), the two wavepaths connecting the input and output autotransformers are observed to comprise a cascade of dual elements. Since a cascade of mutually dual elements remains mutually dual if pairs of dual elements are added or removed, the two transformers 192 and 193 can be removed from the circuit, thus obtaining the amplifier circuit disclosed in the copending application of H. R. Beurrier, Ser. No. 204,865, filed Dec. 6, 1971.

Similarly, applying the commutative principle to the embodiments of FIG. 15 permits the removal from the circuit of transformers 201 and 211, resulting in another of the amplifier circuits disclosed in the above-identified Beurrier application. Thus, the circuits disclosed by Beurrier are shown to be special cases, falling within the general class of amplifiers herein described.

In each of the illustrative embodiments described, the same input and output circuits are shown. This, however, is not necessary. In general, the tap locations, $x$, the reflectivity coefficients, F, and the source and load impedances, $Z_o$, can be different for the input and the output circuits. Furthermore, the circuit configurations themselves may differ. Thus, any of the input circuits could be used with any of the other output circuits. For example, the input circuit of FIG. 13 could be used with the output circuit of either FIG. 14 or FIG. 15. Furthermore, it will be recognized that other means for combining the transformers of FIG. 12 would lead to other, different circuits than those specifically illustrated in FIGS. 13, 14 and 15. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An amplifier comprising:

an input and an output hybrid coupler, each having two pairs of conjugate branches wherein the coefficients of coupling $t$ and $k$ between the branches of one pair of conjugate branches and the branches of the other pair of conjugate branches are unequal;

first and second active stages having mutually dual characteristics, each of which couples one branch of one pair of conjugate branches of the input coupler to a branch of one pair of conjugate branches of the output coupler;

a third branch of said input coupler being the input port of said amplifier;

a third branch of said output coupler being the output port of said amplifier;

and means for match-terminating the fourth branches of said input and output couplers.

2. The amplifier in accordance with claim 1 wherein said means for coupling to each of the third and fourth branches of said couplers includes impedance matching transformers.

3. The amplifier according to claim 1 where one active stage is a transistor connected in a common base configuration, and the other active stage is a transistor connected in a common collector configuration.

4. An amplifier comprising:

an input autotransformer;

a pair of active stages having mutually dual characteristics;

and an output autotransformer;

characterized in that:

a tap on said input autotransformer, constituting the input port of said amplifier, divides said input autotransformer into two unequal portions;

one end of said input autotransformer is connected to the input end of one of said stages;

the other end of said input autotransformer is coupled through a first transformer to the input end of the other of said stages;

an input matching impedance is connected across said input autotransformer;

a tap on said output autotransformer, constituting the output port of said amplifier, divides said output autotransformer into two unequal portions;

one end of said output autotransformer is connected to the output end of one of said active stages;

the other end of said output autotransformer is coupled through a second transformer to the output end of the other of said stages;

and an output matching impedance is connected across said output autotransformer.

5. The amplifier according to claim 4 wherein the tap on said input autotransformer and the tap on said output autotransformer divide the turns on said autotransformers in the ratio of $x : (1-x)$;

and the turns ratios of said first and second transformers are $$A:\sqrt{\frac{x(1-x)}{Y}}$$

where $$Y=\frac{1+\Gamma^2+\Gamma(2x-1)}{1+\Gamma^2-\Gamma(2x-1)};$$

F is the reflection coefficient at the input end of said one active stage when computing the turns ratio of said first transformer and said input matching impedance, and the reflection coefficient at the output end of said one active stage when computing the turns ratio of said second transformer and said output matching impedance;

$x$ is any number between zero and unity other than 0.5;

and $Z_o$ is the impedance of the circuits connected to the input port and to the output port of said amplifier, respectively.

6. An amplifier comprising:

a 1:1 turns ratio input transformer;

a pair of active stages having mutually dual characteristics;

and a 1:1 turns ratio output transformer;

characterized in that:

the input transformer primary winding constitutes the input port of said amplifier;

one end of the input transformer secondary winding is connected to the input terminal of one of said active stages;

the other end of the input transformer secondary winding is coupled to the input terminal of the other of said active stages;

an input matching impedance is connected to a tap on the input transformer secondary winding;

the output transformer primary winding constitutes the output port of said amplifier;

one end of the output transformer secondary winding is connected to the output terminal of one of said active stages;

the other end of the output transformer secondary winding is coupled to the output terminal of the other of said active stages;

and an output matching impedance is connected to a tap on the output transformer secondary winding.

7. The amplifier according to claim 6 wherein the taps on said input and output transformer secondary windings divide said windings in the ratio of $x:(1-x)$;

the input terminal of the other of said active stages, and the output terminal of the other of said active stages are coupled to said input and output transformers, respectively, by means of first and second transformers having a $$(\frac{1-x}{x})^{1/2}:1$$

turns ratios;

and wherein the magnitude of said matching impedances is $$(\frac{x(1-x)}{Y})Z_0;$$

where $$Y=\frac{1+\Gamma^2+\Gamma(2x-1)}{1+\Gamma^2-\Gamma(2x-1)};$$

$x$ is any number between zero and unity other than 0.5

Γ is the reflection coefficient at the input end of said one active stage when computing the magnitude of said input matching impedance, and the reflection coefficient at the output end of said one active stage when computing the magnitude of said output matching impedance;

and $Z_o$ is the impedance of the circuits connected to the input port and to the output port of said amplifier, respectively.

8. An amplifier comprising:

an input and an output hybrid coupler, each having two pairs of conjugate branches 1–2, 3–4 and 1′–2′, 3′–4′ with each of the branches 3–4 and 3′–4′ being organized into two subbranches **3*a*–3*b*, 4*a*–4*b* and 3*a*′–3*b*′, 4*a*′–4*b*′;**

one pair of subbranches **3*a*–3*b* and 3*a*′–3*b*′** of each of said couplers being connected in parallel;

the other pair of subbranches **4*a*–4*b* and 4*a*′–4*b*′** of each said couplers being connected in series;

first and second active stages having mutually dual characteristics;

one of said stages, having a lower input impedance than the other stage, being connected to the parallel-connected subbranches **3*a*–3*b*** of said input coupler;

the other of said stages, having the higher input impedance being connected to the series-connected subbranches **4*a*–4*b*** of said input coupler;

one of said stages, having a lower output impedance than the other stage, being connected to the parallel-connected subbranches **3*a*′–3*b*′** of said output coupler;

the other of said stages, having the higher output impedance, being connected to the series-connected subbranches **4*a*′–4*b*′** of said output coupler;

branch 1 of said input coupler being the input port of said amplifier;

branch 1′ of said output coupler being the output port of said amplifier;

and means for match-terminating branches 2 and 2′ of said input and output couplers.

9. The amplifier according to claim 8 wherein the higher input impedance stage comprises two, parallel connected transistors connected in the common collector configuration;

and wherein said lower input impedance stage comprises two, series connected transistors connected in the common base configuration.

10. An amplifier comprising:

an input transformer and an output transformer, each of which has a primary winding and a secondary winding;

and a pair of active stages having mutually dual characteristics;

characterized in that:

the input end of one of said stages is connected to a tap along the primary winding of said input transformer which divides the turns along said primary winding in the ratio of x : (1-x), where x is any number between zero and unity;

one end of the input transformer primary winding is the input port of said amplifier;

a match-terminating impedance is connected to the other end of said input transformer primary winding;

the input end of the other of said stages is connected across the input transformer secondary winding;

the output end of one of said stages is connected to a tap along the output transformer primary winding which divides the turns along the output transformer primary winding in the ratio of $x : (1-x)$, where $x$ is any number between zero and unity;

the output end of the other of said stages is connected across the output transformer secondary winding;

one end of said output transformer primary winding is the output port of said amplifier;

and in that a match-terminating impedance is connected to the other end of said output transformer primary winding.

11. The amplifier according to claim 10 wherein the primary winding to secondary turns ratio of said transformers is $$1 : \sqrt{\frac{Y}{1-x}},$$

where $$Y = \frac{1+\Gamma^2+\Gamma(2x-1)}{1+\Gamma^2-\Gamma(2x-1)};$$

and Γ is the coefficient of reflection at the input end of the other of said active stages for said input transformer, and the coefficient of reflection at the output end of the other of said active stages for said output transformer.

12. The amplifier according to claim 11 wherein $\Gamma = |1|$.

* * * * *